Sept. 9, 1958 R. C. STEELE 2,851,133
METAL FOIL HONEYCOMB PRODUCT
Original Filed July 14, 1950
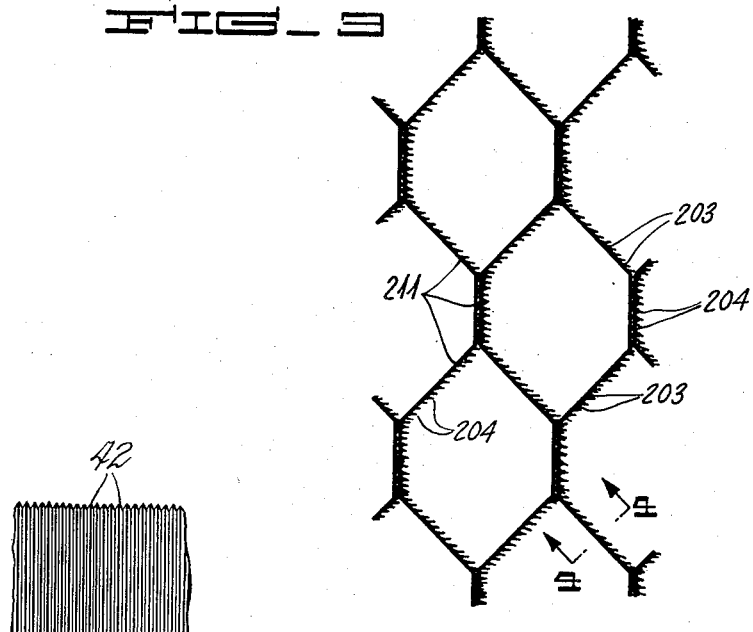
FIG_3
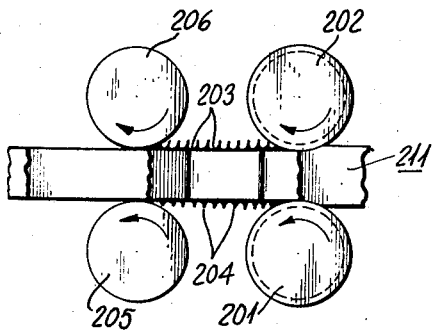
FIG_1
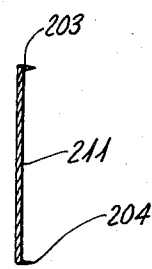
FIG_2   FIG_4
Inventor
ROGER C. STEELE
By Townsend and Townsend
His Attorneys

United States Patent Office 2,851,133
Patented Sept. 9, 1958

2,851,133
METAL FOIL HONEYCOMB PRODUCT

Roger C. Steele, Oakland, Calif., assignor to Hexcel Products Inc., a corporation of California Original application July 14, 1950, Serial No. 173,871. Divided and this application August 12, 1954, Serial No. 449,394

1 Claim. (Cl. 189—34)

This invention relates to a new product and is a division of my copending application, Serial No. 173,871, filed July 14, 1950, now abandoned.

The relatively thin and smooth metal cell edges defining the face surfaces of metal foil honeycomb do not present very large or particularly satisfactory bonding areas to which face skins can be applied. Accordingly, the present invention provides as its principal object for incising metal foil honeycomb throughout its face surfaces to establish incised ends of material which, in turn, can be bent over to lie within the plane of the face surface of the honeycomb in which the incisures are made. These bent over incised ends establish a relatively large bonding area to which face skins or the like can be adhesively applied.

Other objects of the present invention will become apparent upon reading the following specification and referring to the accompanying drawings in which similar characters of reference represent corresponding parts in each of the several views.

In the drawings:

Fig. 1 is a fragmentary view of a fraying cylinder.

Fig. 2 is a diagrammatic view of a form of apparatus suitable for practicing the method.

Fig. 3 is a plan view of a sheet of metal foil honeycomb treated in accordance with the present invention.

Fig. 4 is a sectional view taken on line 4—4 of Fig. 3.

Referring to Fig. 2, the apparatus therein shown comprises a pair of spaced opposed fraying cylinders 201 and 202. Means (not shown) may be provided for supporting rotatably the cylinders and driving them in opposite directions.

Each of the cylinders 201 and 202 of the device are provided or formed with a plurality of closely-spaced alternate ridges and depressions which may comprise spiral threads 42 formed around the peripheries of the cylinders. The cylinders are spaced from one another so that in operation the sharp edges of the threads contact opposite faces of a sheet of honeycomb being fed or passed between said cylinders.

In operation, cylinders 201 and 202 will operate to cut a plurality of incisures, such as indicated at 203, into the face surface defining cell edges of a sheet of metal foil honeycomb 111 fed between said rollers. The plurality of frays or incised ends 204 formed by the action of the fraying cylinders will tend generally to project outwardly, above and below, the top and bottom face surfaces of the material. For this reason, I prefer to provide a pair of end-flattening or compression rollers, indicated at 205 and 206 having substantially smooth surfaces (not being provided with cutting edges) and which are adapted to operate upon the opposite face surfaces of the sheet to cause the frays or incised ends 204 to bend and flatten out generally in the plane of the face surfaces of the sheet. The inherent ductility of the metal foil lends itself particularly to this latter treatment by the compression rollers—i. e., because of the characteristic ductility of metal foil, the ends once bent over and flattened out will remain permanently deformed in this position and will therefore present a relatively enlarged or increased flat area to which face sheets can be bonded. Fig. 3, particularly illustrates the manner in which the flattened incised ends 204 of the honeycomb sheet all extend in a substantially common direction and Fig. 4 particularly illustrates how each incised end lies substantially in the plane of an associated face surface of the sheet and is disposed in a plane substantially perpendicular to the cell forming walls of the said honeycomb sheet.

Although the present invention has been described in some detail by way of illustration and example for purposes of clarity of understanding, it is understood that certain changes and modifications may be made within the spirit of the invention as limited only by the scope of the claim appended hereto.

I claim:

A honeycomb product comprising: a sheet of expanded metal foil honeycomb having its face surface defining cell edges formed with a plurality of shallow incisures establishing a plurality of individual projecting incised ends of metal foil material, each of said incised ends being disposed flatly in the plane of the respective face surface of honeycomb from which it is incised.

References Cited in the file of this patent

UNITED STATES PATENTS 2,477,852     Bacon _____ Aug. 2, 1949

FOREIGN PATENTS 1,011,146     France _____ Apr. 2, 1952